W. De C. May.
Grain Binder.
No. 87,056. Patented Feb. 16, 1869.
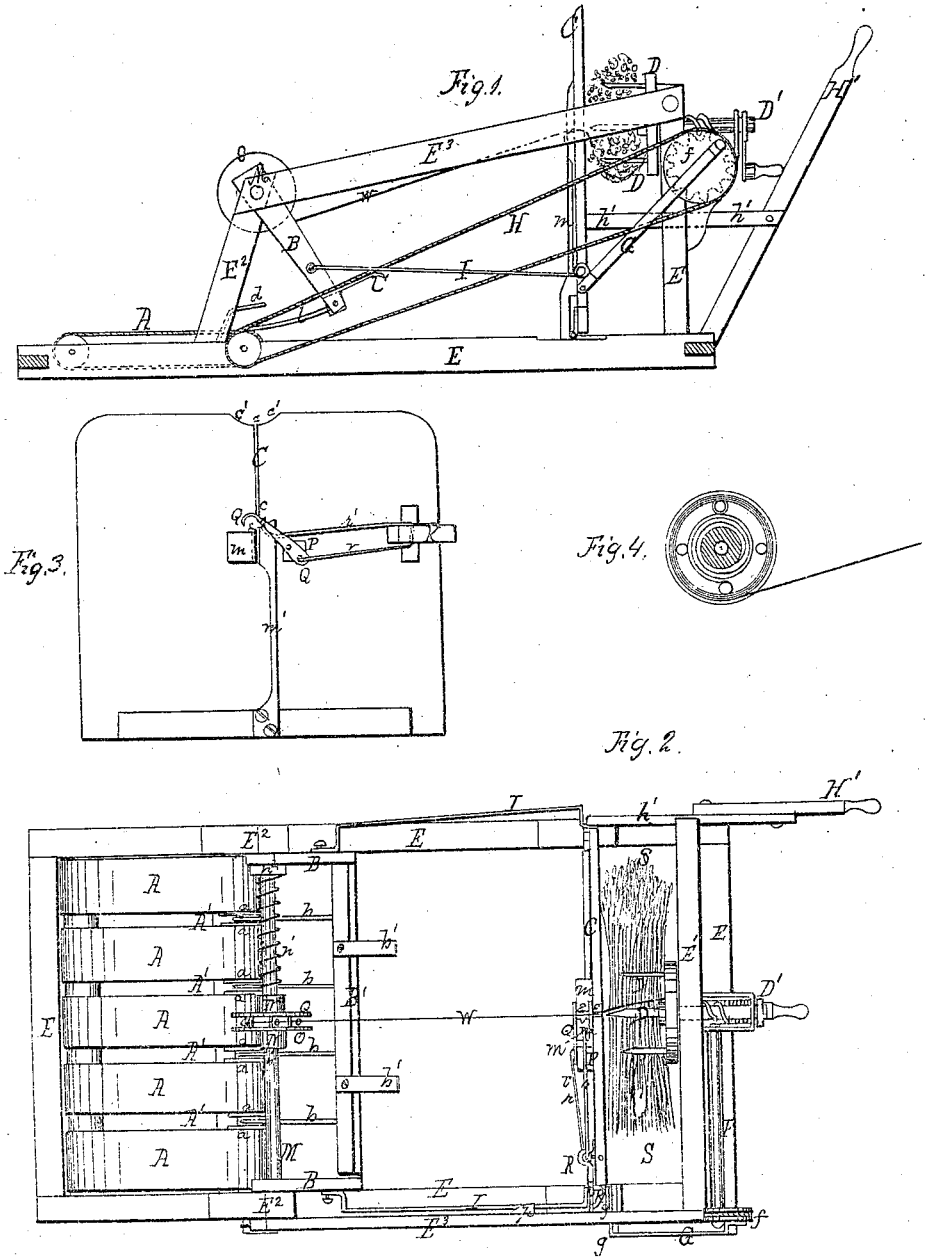

UNITED STATES PATENT OFFICE.

WILLIAM DeC. MAY, OF BALTIMORE, MARYLAND.

IMPROVEMENT IN GRAIN-BINDERS.

Specification forming part of Letters Patent No. 87,056, dated February 16, 1869.

*To all whom it may concern:*

Be it known that I, W. DeC. MAY, of the city and county of Baltimore and State of Maryland, have invented a new and Improved Binding Attachment for Reapers; and I do hereby declare that the following is a full, clear, and exact description of the construction and operation of the same, reference being had to the accompanying drawings, making a part of this specification, in which—

Figure 1 is a side view; Fig. 2, a top view; Fig. 3, a bottom view of the tilting platform, and Fig. 4, a section through the reel.

This invention has for its object the construction of an apparatus which automatically receives the gavel from the sickle, places a wire band around it, ties the band, severs the wire, and drops the gavel upon the ground or into a box provided for the purpose; and to that end the invention consists in a simpler, lighter, less expensive, and more perfectly operating apparatus than has heretofore been brought into use for the same purpose.

The general principle of the machine may be briefly explained as follows: The sickle, operating along the line $x\ x$, Fig. 3, cuts the grain, which falls back upon an endless apron, A. At the proper moment a series of arms, $b\ b$, lift the grain from the apron and throw it upon a tilting platform, C. The latter then tilts backward, carrying the grain with it, and as it tilts it places a wire around the grain. Having thus bound the grain, the platform carries it against a rotating fork, D, which sticks its prongs into the gavel and whirls the latter around several times, twisting the ends of the wire band into a knot. The table then moves back to a horizontal position, but as it falls it removes the gavel from the fork, severs the ends of the wire near the knot, and drops the gavel to the ground or to the receptacle prepared for it.

The general operation of the machine being understood, I will now describe the details of its construction.

E E represent the supporting-frame, which is rectangular in shape, and is provided with a vertical head-board, $E^1$, two uprights, $E^2\ E^2$, near its opposite end, and a beam, $E^3$, extending from the upper end of one of the uprights to the upper corner of the head-board. This frame may be made in the form and proportions shown in the drawings, or in any other which experience may show to be better adapted to the purpose. The power which operates every part of the binding apparatus is applied through a single shaft, D', supported in a socket in the upper part of the head-board and extending through the latter, so as to form the central spindle of the fork, as shown in Figs. 1 and 2. By means of a worm-screw gear, the shaft D' runs another shaft, F, one end of which projects slightly beyond the end of the head-board, bearing a pulley, $f$, having a wrist-pin on its outer face. A belt, H, running from pulley $f$ drives the endless apron A behind the sickle, and a pitman, G, extending from the wrist-pin to a point near the lower edge of the platform C, serves at every revolution of shaft F to tilt the platform from a horizontal position, where it receives the grain, to a vertical position, (shown in the drawings,) where it applies the gavel to the fork and ties and severs the band. The pitman is bent, as seen at $g\ g\ g$, Fig. 2, so as to extend from the wrist-pin on one side of the belt to the edge of the platform on the other without interfering with the operation of the belt. At the opposite edge of the platform a hand-lever, H', may be connected with the edge of the platform by a rod, $h'$, and employed to tilt it by hand or otherwise help move it when necessary. The platform is, by means of rods I I, so connected to a swinging frame, B, pivoted between the upper ends of the standard $E^2\ E^2$, that as the platform is tilted up it swings the frame B back to the position shown in Figs. 1 and 2, and as the platform is tilted down it swings the frame forward again. A rock-bar, B', extends across the lower end of the frame B, and is so constructed and supported that it swings back and forth with the frame, and at the same time rocks freely on its journals. The arms $b\ b$, hereinbefore described as tilting the grain from the apron and throwing it upon the platform from time to time, are rigidly attached to the rock-bar B', and as it rocks they are thrown up to a vertical position or down to the position shown in Figs. 1 and 2. The rock-bar on the side opposite to the arms $b\ b$ is provided with one or two projecting arms, $b\ b$, against which the platform strikes as it tilts down to a horizontal position. It will be observed by a glance at Fig. 2 that the endless apron A is not made in a single piece, but in several pieces, arranged parallel to each other, with narrow spaces A' between; or, in other words, it consists of a series of endless aprons or belts arranged on the same rollers with narrow spaces between them. This is for the purpose of allowing the arms $b\ b$ to drop below the upper surface of the apron when the frame B is in the position shown in Figs. 1 and 2, then to run forward under the grain on the apron, and then, when the platform comes down and strikes the tappets $b'\ b'$, to rise between the aprons to a vertical position at the edge of the platform, lifting all the grain from the aprons and throwing it upon the platform to form a gavel.

Let us now suppose the several parts of the machine to occupy the position shown in Figs. 1 and 2, the platform being tilted up and the fork holding a gavel. As the shaft D rotates it tilts the platform down to a horizontal position, and, as the platform moves down, the rods I I swing the frame B forward and run the tines $b\ b$ under the grain, which lies on the apron at the point occupied by the letters A A. Just as the tines reach the limit of their forward movement, the platform comes down upon the tappets, rocks the bar B' on its axis and causes it to throw all the grain from the apron back upon the platform. The rotation of shaft D' then causes the platform to rise, carrying the grain with it and binding a wire around it as it rises so as to form a gavel. As the platform reaches a vertical position it forces the gavel against the forks, as seen in Figs. 1 and 2, and the rotation of the latter twists the wire and ties it firmly around the gavel.

The tines $b\ b$ work between upright or slightly-inclined guides $a\ a$, of bent wire, projecting up between the aprons and forming not only guides for the tines but a rest for the grain to pile up against while the tines are moving toward the position where they rise and throw the grain over upon the platform. It now remains to describe the means by which the wire is applied around the grain, and when the gavel has been bound and tied is severed so as to detach the gavel from the machine and allow it to drop.

In the first place, the wire is held on a spool of very peculiar construction, supported on a round rod, M, extending across between the upper ends of the posts $E^2\ E^2$. A hollow cylindrical block, N, slides on the rod against a pin, $n$, fixed near the center of the latter. A spring, $n^1$, holds the block against the pin with any required degree of force, the tension of the spring being adjustable by means of a screw-nut, $n^2$, working on the rod and acting against the opposite ends of the spring. By this means the block can be so adjusted that more or less force will be required to turn it or the rod. The block itself forms a bearing for the reel, the latter being composed of two parallel circular disks, O O, rigidly connected together by rods $o\ o$ about half way between the block N and the outer edges of the disks. Thus formed and attached together, a round hole is cut through the center of each disk, and the reel is slipped upon the block to the position shown in Fig. 2. A spring, $o'$, is then attached to the block, and after being coiled several times around it the outer end of the spring is fastened to the disks. The disks are free to rotate upon the block, except as they are restrained by the spring $o'$, and the block is free to turn on the rod, except as it is restrained by the friction of the pin $n$ at one end and the spring $n^1$ at the other. The wire with which the gavels are to be bound is coiled upon the reels O, the loose end extending back to the tying apparatus connected with the platform.

The object of the device connected with rod M is to form a spool or reel which shall unwind the wire as fast as it is needed, and which, in addition to this permanent unwinding, shall be capable of an elastic, yielding motion upon the block, recovering its position again, so as always to draw on the wire and keep it taut, although not holding it with such rigidity as to cause the wire to break or to unwind the spool unnecessarily.

The platform is made with a narrow slit, $c$, extending from its front edge to a point near its center, as seen in Fig. 3, and the corners at the outer edge of the slit may be beveled off, as shown at $c^1$, in order that the wire may be the more readily guided into the slit and may not catch on the corners. The end of the wire is held in a clamp on the under side of the platform, consisting of a fixed block, $m$, and a spring-arm, $m'$, pressing against the block, the latter, if necessary, provided with one or more comparatively sharp blades, $e\ e$, the edge of which wedges into a groove or grooves in the face of the block so as to clamp the wire between the blade and the grooves. One end of the wire being held in this position at the inner end of the slit $c$, and the other being held upon the reel O directly behind the slit $c$, and in a straight line with it, as the platform tilts up and down the wire will pass freely through the slit, so as not to interfere in the least with the action of the platform. The wire is denoted by the red line $w$ in the drawings. The reel being above the front edge of the platform when the latter is in a horizontal position, and considerably higher, it follows that when the platform is down in position for the grain to be thrown upon it by the tines $b\ b$ the wire will intercept the grain near the center of the stalks, and as the platform rises the wire will hold the grain in position on it and will gradually bend over the gavel till the platform reaches the vertical, when the wire will extend nearly around the gavel, almost coming in contact with the parts $m\ m'$ and with the other end of the wire held between them. If, therefore, mechanism can be provided which will bring the wire completely together, twist it, and sever it, we shall have a gavel bound and finished. Such mechanism can be provided and is of the simplest character, consisting only of the apparatus which I will now describe.

P is a block of the same thickness as the blocks m m', and attached to the under side of the platform just behind the part m'. To the face of this block is pivoted a curved or hooked arm, Q. R is a bell-crank or right-angle lever pivoted at the side edge of the platform and provided with a beveled outer end extending beyond the end of the platform, and as the latter rises and falls striking a beveled block, p, affixed to the inner side of the beam E³, so as to rock the lever on its pivot. The inner arm of the lever, extending at right angles with the beveled arm, is connected by a rod, r, to the lower or short end of the curved arm Q, and by another rod, r', to the end of the spring-bar m'. Then as the platform rises the beveled face of lever R, striking against the beveled block p, yields without disturbing the position of the clamp and the hooked arm Q; but the moment that the platform has reached the vertical and begins to retrograde, the end of lever R catches on the sharp edge of block p and throws the hook Q over the wire, forcing the latter down toward the clamp, which at just that instant, by the operation of rod r', is opened to receive it, and thus the two parts of the wire are brought together. Meanwhile the fork D is rapidly rotating the gavel on the front or upper side of the platform, and in a moment the wire, thus brought together, is twisted into a knot immediately in contact with the gavel, the band being tightened around the latter by the twisting of the wire. At the instant that the wire has been sufficiently twisted to form a substantial fastening for the band the lever R slips from the block p, and the spring-bar m', which had been bent by the action of the lever in opening the clamps, flies back with such force that one of the blades e e severs the wire. The blade next to the platform is made sufficiently sharp for this purpose, the others being little more than tongues made in the face of one clamp and operating in connection with grooves in the face of the other, it being necessary that the severing-blade should be at the inner side of the clamps in order that when the gavel has thus been detached and rolled off to the ground the clamps may still hold the other end of the wire as the platform settles to receive a new load.

If it be thought necessary, an arm may be attached to the platform in such a manner that as the platform descends after the wire is severed the arm will draw the gavel from the fork D and insure its dropping to the ground through the space shown at s, Fig. 2.

In speaking of the platform reaching a vertical position and then returning to a horizontal, I do not mean to waive the right to construct my machines so that the platform will pass the vertical if I prefer, or so that it will not quite reach a vertical position.

Having thus described my invention, what I claim as new, and desire to secure by Letters Patent, is—

1. The arrangement of the apron A, swinging frame B, tilting platform C, and rotary fork D, substantially as and for the purpose described.

2. In a grain-binder, the apron A, when constructed with a series of belts A A A, having spaces A' A' between them, and operating in connection with a rock-bar provided with tilting arms or tines b b, substantially as and for the purpose specified.

3. The guides a a, when constructed as described and employed in connection with the several aprons A A A and the tilting tines b b, substantially as described.

4. The swinging frame B, provided with the rock-bar B' at its lower end, the latter supporting the tines b b, substantially as and for the purposes set forth.

5. In a grain-binder, the combination and arrangement of the rod M, block N, pin n, spring $n^1$, nut $n^2$, reel O O o, and spring o', when the several parts are constructed to operate in the manner and for the purposes set forth.

6. The tilting table C, when provided with the slit c and clamps m m', arranged and operating in the manner described and shown and for the purposes specified.

7. In connection with the tilting platform C, having the slit c and clamps m m', the combination and arrangement of the lever Q, rod r, block p, and lever R, whereby the hooked lever Q is caused to catch the wire and bring its parts together, in the manner and for the purposes specified.

8. In connection with the tilting platform C, fixed block m, and spring-bar m', the combination of the rod r, lever R, and block p, operating to open the clamp as described, and also to allow it to spring together and sever the wire, the said parts being operated by the motion of the platform, substantially as described.

9. The combination of the fork-shaft D' with the tilting platform C and swinging frame B carrying the tines b b, when the parts are so constructed that by means of the rods G I, or their equivalents, the fork-shaft D shall cause the platform to tilt and thereby to swing the frame B, substantially as described.

WM. DeC. MAY.

Witnesses:
R. NORRIS, Jr.,
W. H. CARPENTER.